United States Patent
Li et al.

(10) Patent No.: US 8,228,228 B2
(45) Date of Patent: Jul. 24, 2012

(54) APPARATUS AND METHOD FOR RECEIVING ELECTROMAGNETIC WAVES USING PHOTONICS

(75) Inventors: Ming-Chiang Li, Mitchellville, MD (US); Weimin Zhou, Rockville, MD (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 322 days.

(21) Appl. No.: 12/754,681

(22) Filed: Apr. 6, 2010

(65) Prior Publication Data

US 2010/0259440 A1    Oct. 14, 2010

Related U.S. Application Data

(60) Provisional application No. 61/168,037, filed on Apr. 9, 2009.

(51) Int. Cl.
*G01S 13/66* (2006.01)
*H01S 3/14* (2006.01)

(52) U.S. Cl. ............ 342/90; 342/52; 342/54; 342/94; 342/95; 342/375; 342/156; 342/424; 359/341.5; 359/290

(58) Field of Classification Search ............ 342/90, 342/94–97, 99, 175, 52, 54, 156, 375, 424; 359/341.5, 290
See application file for complete search history.

(56) References Cited

U.S. PATENT DOCUMENTS

| 4,864,310 | A  | * | 9/1989  | Bernard et al. ............... 342/368 |
| 5,121,240 | A  | * | 6/1992  | Acampora ..................... 398/101 |
| 5,589,929 | A  | * | 12/1996 | Li ................................ 356/5.01 |
| 5,955,989 | A  | * | 9/1999  | Li ................................ 342/368 |
| 6,011,506 | A  | * | 1/2000  | Li ................................ 342/54 |
| 6,188,808 | B1 | * | 2/2001  | Zhou et al. .................... 385/3 |
| RE37,561  | E  | * | 2/2002  | Li ................................ 356/5.01 |
| 6,388,616 | B1 | * | 5/2002  | Zhou ............................ 342/375 |
| 2006/0066471 | A1 | * | 3/2006 | Li ................................ 342/52 |
| 2009/0002236 | A1 | * | 1/2009 | Zhou ............................ 342/375 |
| 2010/0074379 | A1 | * | 3/2010 | Li ................................ 375/343 |
| 2010/0259440 | A1 | * | 10/2010 | Li et al. ....................... 342/90 |
| 2010/0295532 | A1 | * | 11/2010 | Szajnowski ................ 324/76.38 |

OTHER PUBLICATIONS

Yan Wang; Huadong Meng; Hao Zhang; Xiqin Wang; , "Improved GMPHD tracker with delayed decision," Signal Processing (ICSP), 2010 IEEE 10th International Conference on , vol., No., pp. 255-258, Oct. 24-28, 2010.*

* cited by examiner

*Primary Examiner* — John B Sotomayor
(74) *Attorney, Agent, or Firm* — Alan I. Kalb

(57) ABSTRACT

An apparatus and method for receiving electromagnetic waves using photonics includes a transmission unit transmitting electromagnetic waves in intervals; a time delay unit coupled to the transmission unit and controlling the transmission unit to transmit the electromagnetic waves in the intervals; an antenna receiving the electromagnetic waves reflected from the target; an interferoceiver coupled to the antenna and receiving the electromagnetic waves from the antenna, the interferoceiver comprising an optical recirculation loop to produce replica electromagnetic waves; and a computer identifying the target from the reflected electromagnetic waves.

20 Claims, 5 Drawing Sheets

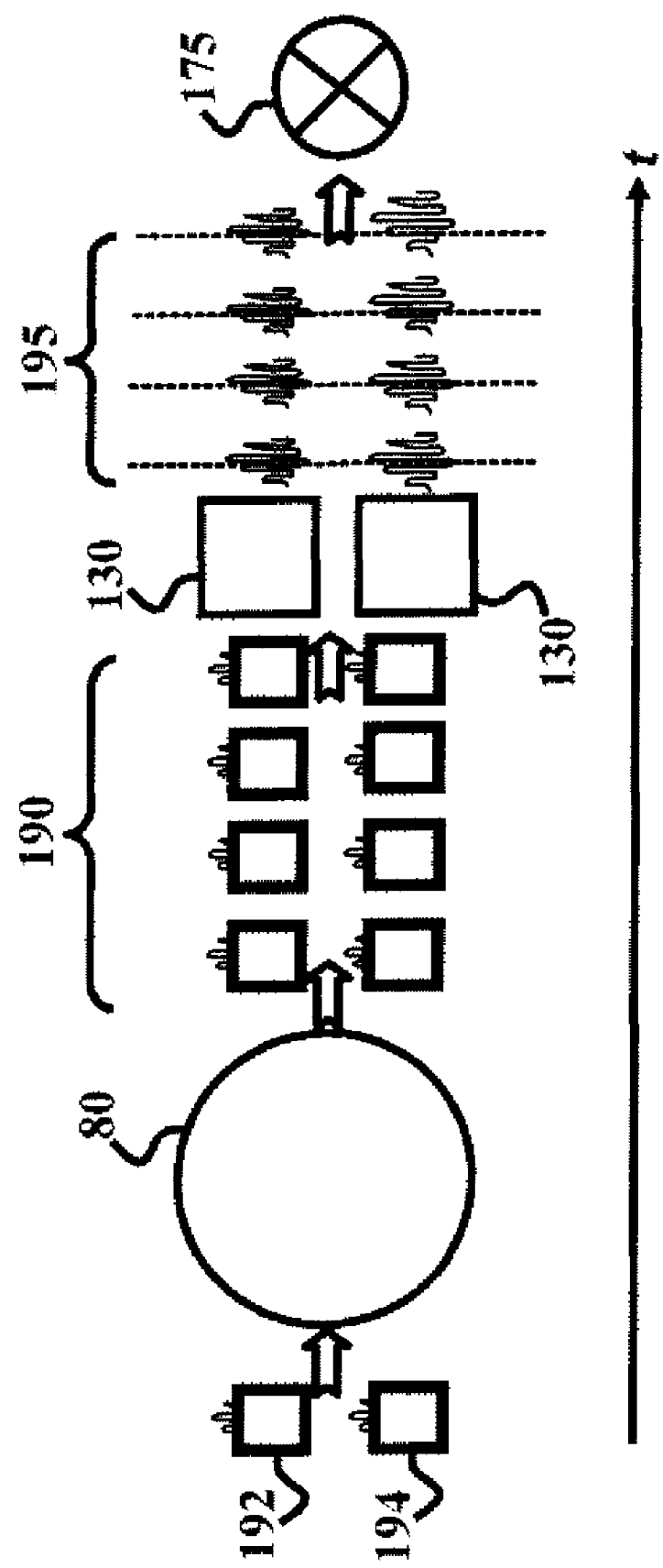

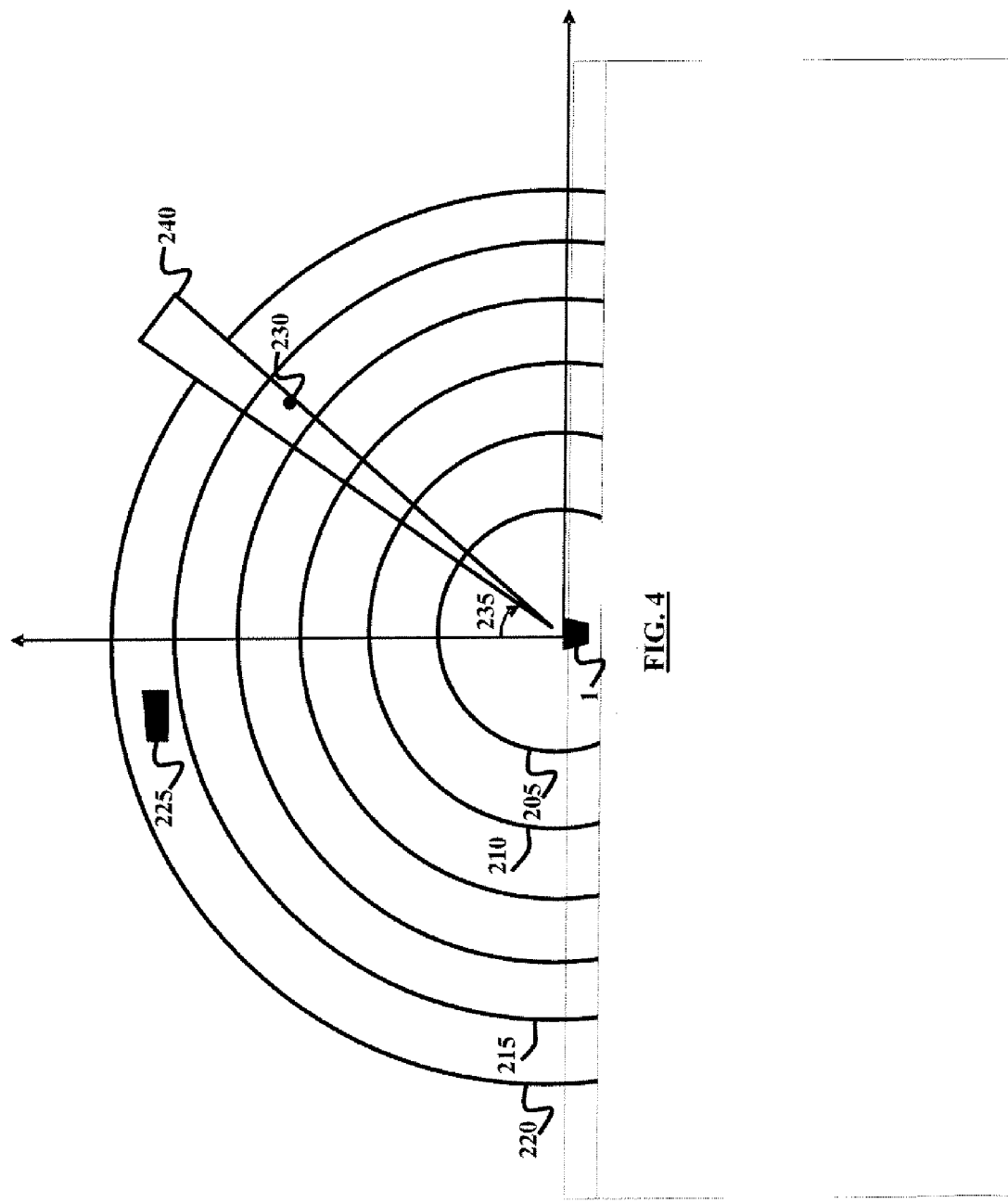

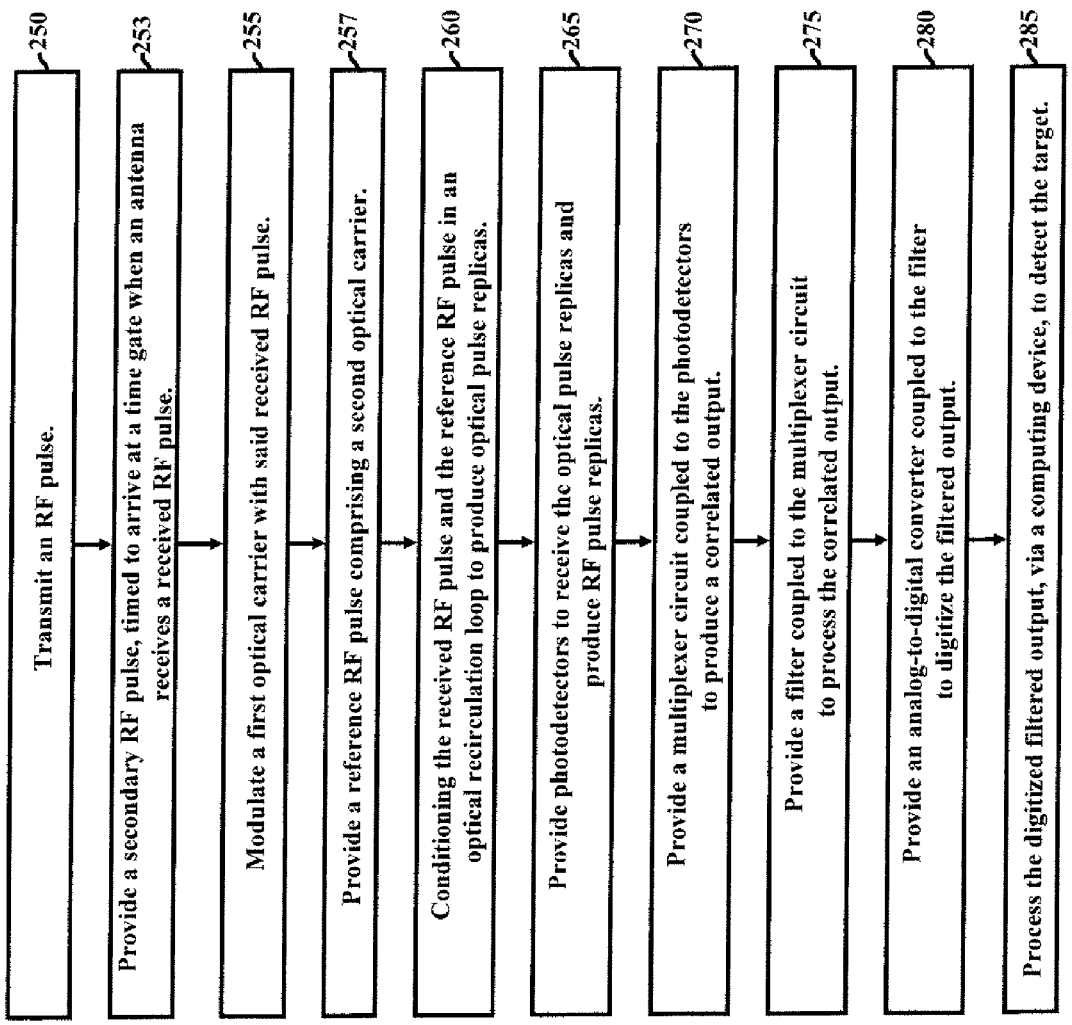

APPARATUS AND METHOD FOR RECEIVING ELECTROMAGNETIC WAVES USING PHOTONICS

CROSS-REFERENCE TO RELATED APPLICATIONS

This application claims the benefit of U.S. Provisional Application Ser. No. 61/168,037, filed on Apr. 9, 2009, the complete disclosure of which, in its entirety, is herein incorporated by reference.

GOVERNMENT INTEREST

The embodiments described herein may be manufactured, used and/or licensed by or for the United States Government without the payment of royalties thereon.

BACKGROUND

1. Technical Field

The embodiments herein generally relate to receiving electromagnetic waves, and, more particularly, to receiving electromagnetic waves using photonics.

2. Description of the Related Art

Radar along with its applications and uses are manifold. Invented in the 1940's and continually refined over the previous decades, radar continues to be the most useful and practical means for a host of applications including tracking aircraft and other aerial born objects. In the past, tracking of aerial targets, such as aircraft or missiles, has been achieved with basic or conventional radar. Types of radar used in the past included various types of Pulsed Doppler coupled with moving target indication receivers, inverse synthetic aperture radar, and radar ranging types of radars. The application of radar has typically been for the purpose of searching, tracking, selecting, and identifying sundry targets through the use of superheterodyne radar receivers. While the same radar equipment of the past are still commonly used today, today's equipment is now coupled with fast computers and digitizers that help to display information more accurately and accelerate data handling.

Problems with present radar and electronic warfare technologies include such issues as range inaccuracy, Doppler range ambiguity, fratricides (due to radar misinterpretation error), excessive clutter contamination and inter system interference, and low ballistic missile interception rate. These issues originate from superheterodyne down conversion, commonly used in conventional radio frequency receivers. In particular, superheterodyne down conversion requires numerous pulses for tracking targets. However, environments and practical conditions change with time. Numerous pulses lead to time average and blurring, a process that masks the pertinent information and contributes to the issues with conventional radio frequency receivers cited above.

For example, a conventional Pulsed Doppler radar receiver typically requires numerous transmitted pulses to achieve a correlation; however, radar targets continuously change their motions. The requirement of numerous pulses leads to motion blurring. In addition, due to motion blurring, target velocities become almost impossible to measure accurately and precisely. Moreover, the micro-Doppler signatures typically cannot be clearly and distinctively revealed by conventional radar systems. With micro-Doppler signatures, the pulses of interest are usually only instantaneously available. The complete and faithful digitization is almost impossible to achieve with the current limitations of conventional radio frequency receivers.

Other limitations of conventional radio frequency receivers include relying on higher speed and higher bandwidth capable technologies, relying on a higher number of bits in an analog-to-digital converter, and relying on faster processing digital electronics to improve overall performance. However, this approach to improve the overall performance of the receivers may reach a physical performance limit soon.

SUMMARY

In view of the foregoing, an embodiment herein provides a system for detecting and tracking a target reflecting electromagnetic waves transmitting from the system, the system comprising a transmission unit transmitting electromagnetic waves in intervals; a time delay unit coupled to the transmission unit and controlling the transmission unit to transmit the electromagnetic waves in the intervals; an antenna receiving the electromagnetic waves reflected from the target; an interferoceiver coupled to the antenna and receiving the electromagnetic waves from the antenna, the interferoceiver comprising an optical recirculation loop to produce replica electromagnetic waves; and a computer identifying the target from the reflected electromagnetic waves.

In such a system, the interferoceiver may comprise a photodetector to convert optical input to radio frequency output and to determine a difference between the transmitted electromagnetic waves and the reflected electromagnetic waves. Such a system may further comprise a time gate coupled to the transmission unit and the antenna and comprising a gate, wherein the transmission unit transmits trigger electromagnetic waves to the time gate in trigger intervals, and the time gate, upon receiving the trigger electromagnetic waves, opens the gate to allow throughput of received electromagnetic waves received from the antenna. Moreover, the optical recirculation loop may comprise an optical path length adjuster and the optical path length adjuster may comprise a dispersion compensation unit to reduce the relative traveling length variations due to different wavelengths of the transmitted electromagnetic waves and the reflected electromagnetic waves. Furthermore, the optical recirculation loop may comprise an electronic switch controlled by the computer. Additionally, the optical recirculation loop may comprise an optical path length random perturbation modulator to reduce the resonance effect on the noise signal in the optical recirculation loop. Moreover, the optical path length random perturbation modulator may comprise at least one of an optical phase shifter/modulator and a fiber stretcher. In addition, the optical recirculation loop may comprise an optical amplifier and an optical isolator connected in series to amplify the electromagnetic waves. Furthermore, the optical amplifier may comprise an erbium-doped fiber amplifier. In addition, the computer may comprise a Fourier transform unit to transform the electromagnetic waves from a time domain to a frequency domain, and to obtain a Doppler shift and micro Doppler sidebands of a the target.

Another embodiment herein provides an interferoceiver apparatus comprising a first input; a second input; a combiner combining the first input and the second input; an optical recirculation loop coupled to the combiner; a splitter coupled to the optical recirculation loop to produce a first splitter output and a second splitter output; a first photodetector coupled to the first splitter output; a second photodetector coupled to the second splitter output; a multiplexer circuit coupled to the first photodetector and the second photodetector producing a correlated output; a filter coupled to the multiplexer circuit to process the correlated output; and a analog-to-digital converter coupled to the filter to digitize the filtered output.

Such an apparatus may further comprise a radio frequency (RF) directional coupler coupled to receive input from the first splitter output. In addition, such an apparatus may further comprise: an electronic servo coupled to the RF directional coupler; and an optical amplifier in the optical recirculation loop, wherein the electronic servo controls the optical amplifier. In addition, such an apparatus may further comprise a radio frequency (RF) phase shifter coupled to at least one of the first photodetector and the second photodetector. Moreover, the multiplexer circuit may comprise at least one of a radio frequency (RF) mixer and a 2×1 RF combiner. Additionally, the multiplexer circuit may comprise a Square Low RF detector. Furthermore, the Square Low RF detector may comprise a Low Barrier Schottky diode. In addition, the filter may comprise a low pass radio frequency (RF) filter. Moreover, such an apparatus may further comprise: a gate coupled to the combiner and the optical recirculation loop; a switch coupled to the optical recirculation loop; and an electronic control device to control the gate and switch.

Another embodiment herein provides a method of detecting a target through electromagnetic waves, the method comprising transmitting a radio frequency (RF) pulse, the RF pulse transmitted by an RF transmission unit; providing a secondary RF pulse, transmitted by the RF transmission unit and timed to arrive at a time gate when an antenna receives a received RF pulse; modulating a first optical carrier with the received RF pulse; providing a reference RF pulse comprising a second optical carrier; conditioning the received RF pulse and the reference RF pulse in an optical recirculation loop to produce optical pulse replicas; providing photodetectors to receive the optical pulse replicas and produce RF pulse replicas; providing a multiplexer circuit coupled to the photodetectors to produce a correlated output; providing a filter coupled to the multiplexer circuit to process the correlated output; providing an analog-to-digital converter coupled to the filter to digitize the filtered output; and processing the digitized filtered output, via a computing device, to detect the target.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3 illustrates a schematic diagram of an optical recirculation loop according to an embodiment herein;

FIG. 4 illustrates a schematic diagram of a radar screen according to an embodiment herein; and FIG. 5 is a flow diagram illustrating a preferred method according to an embodiment herein.

DETAILED DESCRIPTION OF PREFERRED EMBODIMENTS

Figure 1:
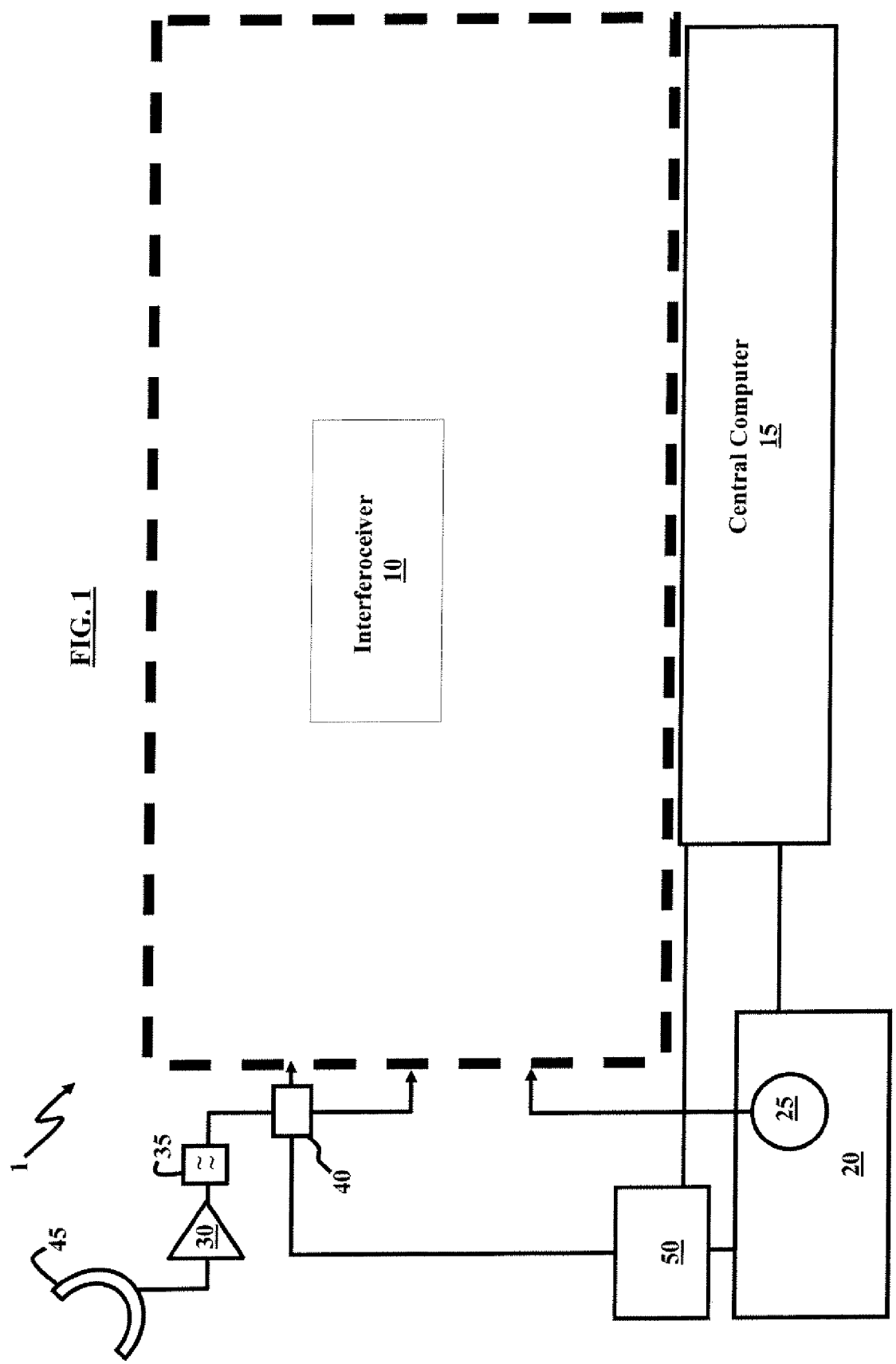
FIG. 1 illustrates a schematic diagram of a radar system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a new pulse Doppler radar architecture and configuration that uses an RF-Photonic interferoceiver to perform an analog true time domain correlation of the received RE signal pulse in a hardware circuitry. In contrast with conventional radar technology, an interferometric receiver requires only a single pulse. Single pulsing makes masking disappear and avoids the need for time averages, which leads to blurring. In addition, embodiments herein provide a signal alignment synchronization mechanism that allows a received pulse to be aligned in time with a reference pulse at the input of the RF-Photonic correlation receiver or recirculation loop. Moreover, the embodiments herein provide mechanisms to overcome loop instabilities and noises and reduce resonant noise in the loop by preventing unwanted resonance for circulating signals. The embodiments herein permit air traffic control with more precision to detect when one airplane is behind another airplane and determine distance and velocity difference of the two airplanes. Referring now to the drawings, and more particularly to FIGS. 1 through 5, where similar reference characters denote corresponding features consistently throughout the figures, there are shown preferred embodiments.

FIG. 1 illustrates a schematic diagram of a radar system 1 in accordance with an embodiment herein. In FIG. 1, radar system 1 uses an RF-Photonic interferoceiver 10 (described in further detail below). In addition, radar system 1 contains an RF pulse transmission device 20. A stable RF microwave oscillator 25 is used in RF pulse transmission system 20, which can provide a reference signal to interferoceiver 10. Moreover, radar system 1 includes a receiving antenna 45 that receives RF pulse signals reflected from targets. Receiving antenna 45 is connected to a low noise RF amplifier 30 and a band pass filter 35 to amplify and filter received signals, which are subsequently sent to a time gate 40 that may operate as a high-speed switch. Additionally, as described in further detail below, a central computer 15 sends a trigger pulse to control the times for transmission and opening and closing time gate 40 at the front end of interferoceiver 10. Time gate 40 selects received signals from receiving antenna 45 at a range and provides the selected receiving RF pulse signals as input pulse signals to interferoceiver 10. Radar system 1 also includes a programmable time delay unit 50, which is also described in further detail below.

Figure 2:
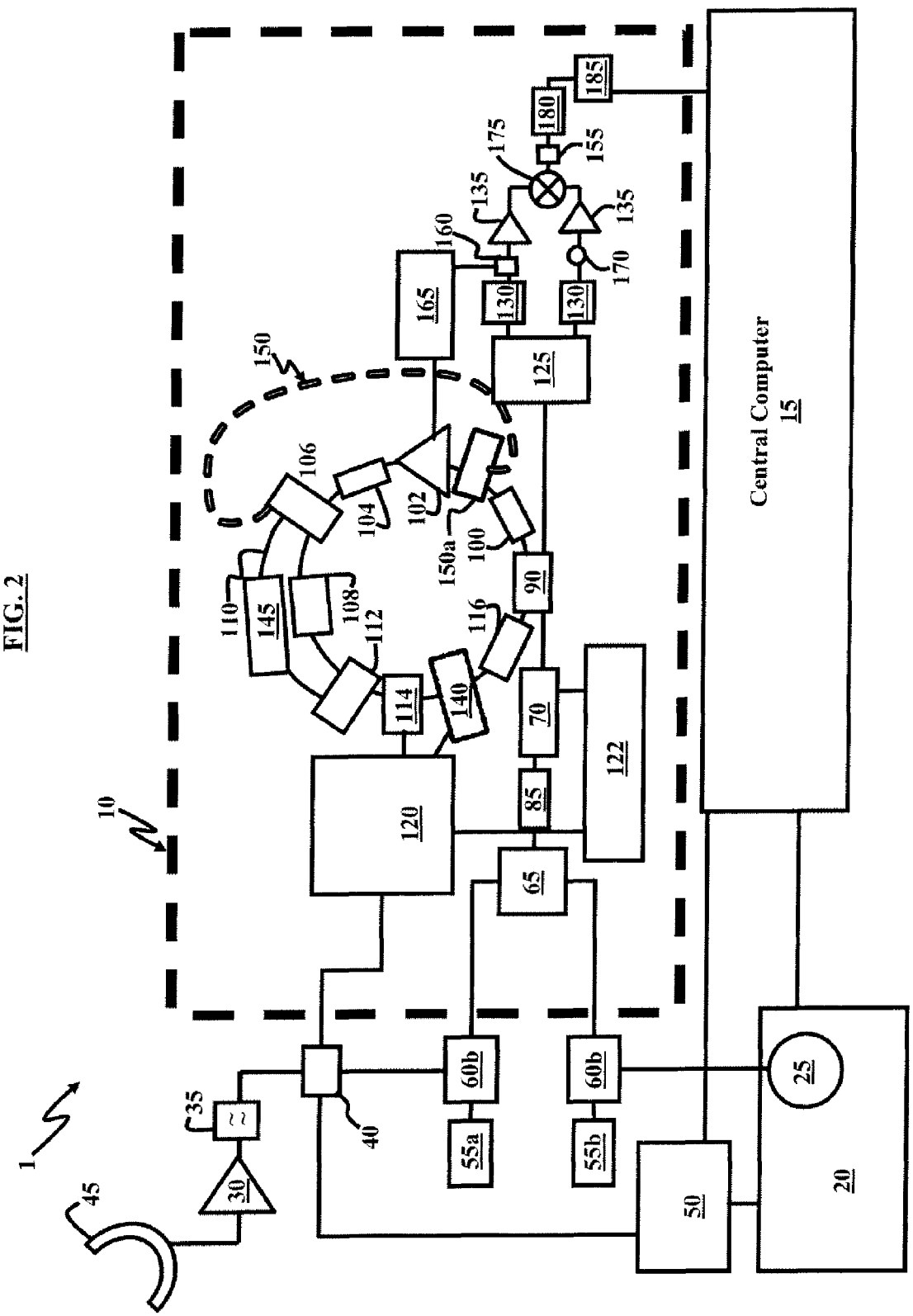
FIG. 2 illustrates a schematic diagram of an alternative of the radar system according to an embodiment herein.

FIG. 2, with reference to FIGS. 1 and 3, illustrates a schematic diagram of a radar system 1 in greater detail, in accordance with an embodiment herein. As shown, radar system 1 includes an RF radar pulse transmission device 20 and a stable RF microwave oscillator 25, which is used to provide a reference signal to interferoceiver 10. A receiving antenna 45 is also shown that receives RF pulse signals (not shown) reflected from targets (not shown). Receiving antenna 45 is connected to a low noise RF amplifier 30 and a band pass filter 35 to amplify and filter the received signals which are sent to a time gate 40. Time gate 40 selects the received signals within a certain range, as described in further detail below, and provides the selected receiving RF pulse signals to interferoceiver 10. In addition, interferoceiver 10 may accept input from two continuous wave lasers (e.g., lasers 55a and 55b) that provide energy of wavelength $\lambda_1$ and $\lambda_2$, respectively. As shown in FIG. 2, the output of lasers 55a and 55b are sent to optical modulators (e.g., optical modulator 60a and optical modulator 60b). In particular, laser 55a, with a $\lambda_1$ wavelength, is modulated by optical modulator 60a according to a reference RF signal from RF oscillator 25 and laser 55b, with $\lambda_2$ wavelength, is modulated by optical modulator 60b according to the received RF pulse signal from time gate 40.

As shown in FIG. 2, lasers 55a and 55b are then combined by a wavelength division multiplex (WDM) combiner 65 via optical fiber 65a or another optical low loss waveguide. The frequency difference between $\lambda_1$ and $\lambda_2$ is preferable larger than the RF microwave operation frequencies and its bandwidth. After WDM combiner 65, the modulated laser lights are sent to an optical gate 70, which operates as a high speed optical switch that produces a pair of RF modulated optical pulses for an optical recirculation loop 80. An optional fiber polarizer 85 can be placed before optical gate 70, if necessary. In addition, optical gate 70 is connected to a first input of a 2×2 optical coupler 90 that is used in optical recirculation loop 80. The optical recirculation loop 80 is formed by connecting one output of 2×2 optical coupler 90 with a second input of 2×2 coupler 90 with several optical recirculation components inserted in between. For example, the optical components in recirculation loop may include: an optical isolator 100, optical amplifier 102 (e.g., an erbium-doped fiber amplifier (EDFA)) and a second optical isolator 104 connected in series for necessary amplification of the optical pulse. The output of the second isolator 104 is connected to a WDM splitter 106, which route the pulses pair into two separated paths by the two different wavelength $\lambda_1$ and $\lambda_2$ of laser 55a and 55b. While not shown in FIG. 2, WDM splitter 106 may include wavelength filters to filter out optical noise produced by optical amplifier 102. Moreover, additional filters (e.g., filter 108) may be added at the outputs of WDM splitter 106.

As shown in FIG. 2, an optical path length adjuster 110 (with a dispersion compensation unit 145) may be inserted in one of the optical paths to reduce the relative traveling length variations due to different wavelengths (e.g., wavelengths $\lambda_1$ and $\lambda_2$) between the two pulses, therefore compensate the optical paths length difference between the two pulses in the whole loop. By carrying the received RF pulse and reference RF pulse between two optical carriers of close but different wavelengths and sending them into the sample long fiber loop and amplified same optical amplifier and using wavelength division multiplex to separate them for only a short distance to compensate the dispersion (via dispersion compensation unit 145), this will allow most noise generated in the loop to be canceled at the end, therefore minimizing the instability of the long fiber and noise generated by the optical amplifier. These variations might be caused by fiber dispersion and unequal physical loop lengths. The presence of variations can cause contaminations on Doppler measurements and micro Doppler signatures. After the optional optical path length adjuster 110, the two optical paths produced by WDM splitter 106 are then connected into two inputs of a WDM combiner 112. A high speed optical switch 114 is coupled to WDM combiner 112 to filter out any light noise outside of the switching window that let the optical pulses passing though.

As further shown in FIG. 2, switch 114 is connected to an optical polarization controller 116 that is connected to the second input of the 2×2 coupler 90 to close recirculation loop 80. Switch 114 is controlled by an electronic control circuit 120 that synchronizes with the control of optical gate 70, through an electronic control circuit driver 122, before the loop. In addition, central computer 15 has access to electronic control circuit 120 and optical gate 70 through electronic control circuit driver 122.

As described in further detail below, FIG. 2 includes input pulse pair (not shown) before optical recirculation loop 80 and output pulse replica pairs (not shown) after optical recirculation loop 80. At the second output of the 2×2 coupler 90, a WDM splitter 125 can be connected to split the pulse pairs. The outputs of WDM splitter 125 may then be connected to photodetectors 130, which convert the RF modulated optical pulse signals (from optical recirculation loop 80) into RF electronic pulse signals to form two branches of RF electronic paths. Thus, for the $n^{th}$ replica pair, Doppler shifts caused by motions of a target will lead to phase differences among the members in the pair. The differences are a function of the $n^{th}$ replica number. Moreover, RF amplifiers 135 may be added after photodetectors 130 to amplify the RF pulse signals. Although not shown in FIG. 2, an optional optical amplifier may also be connected to a second output of the 2×2 coupler 90.

As described above, optical pulse replica pairs (shown in FIG. 3) are produced by optical recirculation loop 80 in a time series. The produced optical replica pairs (shown in FIG. 3) propagate through photodetectors 130 and are converted to replica pairs (shown in FIG. 3) of the original input RF and reference pulses. These replica pairs (shown in FIG. 3) are correlated at a nonlinear device 155. A small portion of the RF pulse signals can be taped using a RF directional coupler 160 from one or both branches to monitor the pulse replicas (shown in FIG. 3) produced by optical recirculation loop 80 and used in an electronic servo 165 that provides feedback and controls the gain of optical amplifier 102 in optical recirculation loop 80. In addition, an optional RF phase shifter 170 can be added in one of the branch to set a phase adjustment, $\phi$, to compensate the phase between the two replicas of each pair. The two branches are connected to a RF electronic multiplexer circuit 175 to multiply each pulse pairs (shown in FIG. 3), where multiplexer circuit 175 multiplies the two inputs RF signal. Multiplexer circuit 175 may include, for example, an RF mixer or a 2×1 RF combiner followed by a Square Low RF detector (e.g., Low Barrier Schottky diode). Additionally, a low pass RF filter 180 is connected at the output of multiplexer circuit 175 to filter out all the high frequency components produced by multiplexer circuit 175.

Low pass RF filter 180 produces low frequency, or baseband, beating signals plus the DC signals that contain the correlation data. The beating signals and correlation data are sent to an analog-to-digital converter (ADC) 185 and subsequently provided as input to central computer 15. Central computer 15 may further process the data; for example, a Fourier transformation may be performed (via a Fourier transform unit, not shown) to transform the series of beating pulse signals from time domain to the frequency domain, and therefore obtain the Doppler shift and micro Doppler sidebands of a moving target.

Also shown in FIG. 2 are several optional components to radar system 1. For example, an optical path length random perturbation modulator device 140, which may include an optical phase shifter/modulator or fiber stretcher, may be added to optical recirculation loop 80 to reduce the resonance effect on the noise signal in optical recirculation loop 80. In addition, a ring laser loop 150 and WDM splitter 150a may be added in optical recirculation loop 80 to stabilize optical amplifier 102 by introducing a third laser lasing a third wavelength through ring laser loop 15, where the third laser is lasing in CW mode. Furthermore, while not shown in FIG. 2, lasers 55a and 55b can be replaced by two laser transmitters (laser/modulator) with wavelengths $\lambda_1$ and $\lambda_2$, respectively. With two laser transmitters, instead of using a reference signal from stable oscillator 25, a time delayed copy of transmitted RF pulse (with any waveform) may be used as input at optical modulator 145.

FIG. 3, with reference to FIGS. 1 and 2, illustrates a schematic diagram of optical recirculation loop 80 (shown in FIG. 2), according to an embodiment herein. In FIG. 3, the RF pulses 192 and reference pulses 194 are inputs (as generated by lasers optical modulators 60a and 60b, shown in FIG. 2) to optic recirculation loop 80 (shown in FIG. 2). Optical pulse replica pairs 190 are then produced by optical recirculation loop 80 (shown in FIG. 2) in a time series. The produced optical replica pairs 190 propagate through photodetectors 130 (shown in FIG. 2) and are converted to replica pairs 195 of the original input RF pulses 192 and reference pulses 194. These replica pairs 195 are correlated at a nonlinear device 155 (shown in FIG. 2). A small portion of the RF pulses 192 may be taped using a RF directional coupler 160 (shown in FIG. 2) from one or both branches to monitor the pulse replicas pairs 195 produced by optical recirculation loop 80 (shown in FIG. 2) and used in an electronic servo 165 (shown in FIG. 2) that provides feedback and controls the gain of optical amplifier 102 (shown in FIG. 2) in optical recirculation loop 80. In addition, an optional RF phase shifter 170 (shown in FIG. 2) can be added in one of the branch to set a phase adjustment, $\phi$, to compensate the phase between the two replicas of each pair. The two branches are connected to a RF electronic multiplexer circuit 175 (shown in FIG. 2) to multiply each pulse pairs, where multiplexer circuit 175 multiplies the two input RF signal. Multiplexer circuit 175 (shown in FIG. 2) may include, for example, an RF mixer or a 2×1 RF combiner followed by a Square Low RF detector (e.g., Low Barrier Schottky diode). Additionally, a low pass RF filter 180 (shown in FIG. 2) is connected at the output of multiplexer circuit 175 (shown in FIG. 2) to filter out all the high frequency components produced by multiplexer circuit 175.

The radar system described in FIG. 1 can operate in two modes: 1), Searching mode for searching, tracking, selecting, and prioritizing targets of interest; 2), High resolution mode for precision Doppler detection and micro Doppler identification. However, the embodiments herein are not limited to this division of modes; there may be other mode variations as well.

For example, radar system 1 can scan in one or two directions for searching targets. When a target(s) is located in a particular range and angle bearing, with the help of interferoceiver 10, the target(s) of interest may be selected and prioritized. Then radar system 1, with the help of interferoceiver 10, again switches into a high-resolution Doppler detection and micro Doppler identification mode to measure the precise Doppler and micro Doppler signature of selected the target(s) according to a priority.

FIG. 4 illustrates a schematic diagram of a radar screen in searching mode in accordance with the embodiments herein. As shown in FIG. 4, radar system 1 is searching for target 230, but not background object 225, in the interested area or direction by scanning (i.e., changing the angle of transmission and receiving of radar beam 240) which may be performed in one or two dimensions. For each direction, the entire searching distance is divided into "N" range intervals, where range 205 is the first interval, range 210 is the second interval, range 215 is the N−1 interval and 220 is the $N^{th}$ interval. The travel time for a microwave transmitted from radar system 1 at each range interval is delta $T_n$, where N the interval and is an integer number greater than one. In addition, central computer 15 (shown in FIGS. 1 and 2) may send a trigger pulse to the transmission system unit 20 (shown in FIGS. 1 and 2) of radar system 1, which has the stable precision oscillator 25 (shown in FIGS. 1 and 2) generate continuous wave radio frequency signals and a radio frequency gate that can send the radio frequency pulse to a transmission antenna (not shown). The trigger pulse sends RF pulses with a specific time interval between each two pulses.

Simultaneously, for each pulse transmitted, radar system 1 produces a series of secondary pulses to be sent into time delay unit 50 (shown in FIGS. 1 and 2). Time delay unit 50 (shown in FIGS. 1 and 2) is programmed such that a pulse meets the receiving antennas gate (not shown) in time delay unit 50 so as to be reflected from a predetermined target range. In particular, time delay unit 50 (and receiving antennas gate) are programmed to open for a specific time interval such that the series of secondary pulses cover the various distance ranges.

For example, RF radar pulse transmission device 20 may produce a series of K secondary trigger pulses (where K is an integer and K<N) to be sent into programmable time delay unit 50, as shown in FIG. 1. The time interval between secondary trigger pulses is $\Delta T_k$, therefore $\Delta T_k > \Delta T_n$. These trigger pulses are sequentially delayed individually for different delay time by time delay unit 50 such that each pulse will reach the receiving antenna's gate to meet a received pulse reflected from a predetermined target range I, where i is an integer, 1<i<N. The delay time is $(2_i \times \Delta T_n)$. The gate is programmed to open for a time interval $\Delta T_n$. Therefore, for each transmitted RF pulse, these series of K secondary trigger pulses will cover the K distance ranges.

If, at one of the distance ranges, a target (e.g., target 225) is presented, the reflected pulse from the target received by receiving antenna 45 will pass through time gate 40, which was opened by secondary trigger pulse signal sent by time delay unit 50. Interferoceiver 10 subsequently receives an input pulse from time gate 40.

While in search mode, an input pulse may only make few cycles of recirculation within optical recirculation loop 80 to produce few pulse-pair replicas (i.e., 10 to 100 replica pairs as needed to detect the target) in a very short time interval that is controlled by coupler 90 in optical recirculation loop 80, as shown in FIG. 2. This time interval may be smaller than the secondary trigger pulses time interval $\Delta T_k$, therefore, the replicas from the first input pulse pair in the loop may not meet the second input pulse-pair.

If there is no moving target or only a background object is presented at one the distance range, central computer 15 can easily rule out the clutters or noises. For moving targets, central computer 15 may provide the coarse Doppler shifts. Thereafter, targets of interest can be selected according to measured Doppler shifts. Tracking of these targets with sequential transmitted pulses will provide their Doppler shift variations. Central computer 15 can then prioritize these targets of interest by Doppler shifts and Doppler shift variations.

Normally, the total processing time interval (for optical recirculation loop 80 to produce necessary number of replica) to resolve a target (e.g., target 225) is larger than the range time interval (e.g., $\Delta T_n$), so multiple transmission pulses with a very large time interval ($\Delta T_k \gg \Delta T_n$) can be used to further divide/distribute the total search time in one direction by multiple pulses such that only a few ranges are searched using one transmission pulse. For example with two transmission pulses, odd number ranges are searched by the first pulses, and even number of ranges are searched by the second pulses, therefore one can increase the processing time for each range by $2 \times \Delta T$.

If the target cross-section is too small or slow moving, or there is too much clutter, multiple transmitted pulses can also be used to help find the target with timeframe update.

The total numbers of distance range and/or range intervals can be dynamically changed or programmed as well as the number of transmitted pulses to be used in the search with time intervals distribution and pulse width can be dynamically changed as desired. This dynamic change allows the system to perform coarse searches and fine searches alternately in order to find the target in a shorter time for different field condition.

Once a target of interest is chosen from the priority list, radar system 1 may stop the searching mode and switch to the high-resolution mode for high precision Doppler shift and micro-Doppler identification measurements. When operating in high-resolution mode, the target range may be known.

In high resolution mode, central computer 15 sends a trigger pulse to RF radar pulse transmission device 20 to send a new (or two for time updated signal) transmitted RF pulse(s) with the same or different pulse width than, for example, the search mode described above. Simultaneously, RF radar pulse transmission device 20 produces a secondary trigger pulses to be sent into time delay unit 50 for the time delay equivalent to the round trip RF pulse travel time from antenna to the target (e.g., target 225). Therefore, the delayed trigger pulse will reach time gate 40 to meet a received pulse reflected from the target.

The rest of the process is similar to that described above, except the input pulse (not shown) may circulate in optical recirculation loop for a longer time (i.e., 0.1 to 1 second) to produce a very large number of pulse replicas (i.e., 3000-30,000 replicas). Therefore, after the Fourier transformation from time domain to frequency domain, micro-Doppler side bands can be resolved with a resolution as high as Hz scale.

In addition, the embodiments described herein may be used to collect micro-Doppler data from existing known targets to form a data bank. Subsequently, when micro-Doppler data has been collected from an unknown target (e.g., target 225) in the field, the micro-Doppler data from the unknown target can be compared with the data bank to improve identification of the unknown target.

FIG. 5, with reference to FIGS. 1 through 4, illustrates a flow diagram according to an embodiment herein. As shown in FIG. 5, step 250 describes transmitting an RF pulse (e.g., via RF radar pulse transmission device 20). Step 253 describes providing a secondary RF pulse, timed to arrive at a time gate when an antenna (e.g., receiving antenna 45) receives a received RF pulse. Step 255 describes modulating a first optical carrier (e.g., laser 55a) with the received RF pulse (e.g., via laser 55a, as modulated by optical modulator 60a). Step 257 describes providing a reference RF pulse (e.g., via laser 55b, as modulated by optical modulator 60b) comprising a second optical carrier (e.g., laser 55b). Step 260 describes conditioning the received RF pulse and the reference RF pulse in an optical recirculation loop (e.g., optical recirculation loop 80) to produce optical pulse replicas (e.g., optical pulse replicas 190). Step 265 describes providing photodetectors (e.g., photodetectors 135) to receive the optical pulse replicas (e.g., optical pulse replicas 190) and produce RF pulse replicas (RF pulse replicas 195). Step 270 describes providing a multiplexer circuit (e.g., multiplexer circuit 175) coupled to the photodetectors (e.g., photodetectors 135) to produce a correlated output. Step 275 describes providing a filter (e.g., filter 180) coupled to the multiplexer circuit (e.g., multiplexer circuit 175) to process the correlated output. Step 280 describes providing an analog-to-digital converter (e.g., A/DC 185) coupled to the filter (e.g., filter 180) to digitize the filtered output. In step 285, the method describes processing the digitized filtered output, via a computing device (e.g., computer 15), to detect the target (e.g., target 230).

As described above, the embodiments herein demonstrate the construction and operation with many possible hardware configurations and with many possible component choices that solve the problems in convention radar systems. The embodiments described herein use optical fiber recirculation loops (e.g., optical recirculation loop 80) to overcome the limitations of conventional technology and cross-correlates the numerous replicas (e.g., pulse replicas 190) as produced by the loops to replicas (e.g., RF pulse replicas 195) from a copy of the originally transmitted radar pulse. After the time domain cross correlation, a Fourier transformation (e.g., from Fourier transform unit) from the time domain to the frequency domain may be performed to obtain the Doppler shift and micro Doppler signatures of a moving target (e.g., target 230). In addition, the embodiments described herein offer improvements over conventional radar systems because by adding a reference RF signal carried by a different optical carrier (e.g., carriers 192 and 194) in parallel with input optically carried RF signal pulse to a single fiber recirculation loop (e.g., optical recirculation loop 80) through wave length division multiplexing devices (e.g., multiplexer circuit 175). Therefore, the noise generated by the optical loop for both pulse-pair are mostly coherent and can be canceled later on by beating the signal with the reference. In addition to using time domain and wavelength domain filtering (e.g., filter 180) to suppress loop noise generated by the spontaneous emission of fiber amplifier (e.g., optical amplifier 102), and using an optical path perturbation device (e.g., perturbation modulator device 140) in the loop, embodiments described can further reduce the noise and instability of the optical pulse recirculation loop (e.g., optical recirculation loop 80).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for detecting and tracking a target reflecting electromagnetic waves transmitting from said system, said system comprising:
    a transmission unit transmitting electromagnetic waves in intervals;
    a time delay unit coupled to said transmission unit and controlling said transmission unit to transmit said electromagnetic waves in said intervals;

an antenna receiving said electromagnetic waves reflected from said target;

an interferoceiver coupled to said antenna and receiving said electromagnetic waves from said antenna, said interferoceiver comprising an optical recirculation loop to produce replica electromagnetic waves; and a computer identifying said target from said reflected electromagnetic waves.

2. The system of claim 1, wherein said interferoceiver comprises a photodetector to convert optical input to radio frequency output and to determine a difference between said transmitted electromagnetic waves and said reflected electromagnetic waves.

3. The system of claim 1, further comprising a time gate coupled to said transmission unit and said antenna and comprising a gate, wherein said transmission unit transmits trigger electromagnetic waves to said time gate in trigger intervals, and said time gate, upon receiving said trigger electromagnetic waves, opens said gate to allow throughput of received electromagnetic waves received from said antenna.

4. The system of claim 1, wherein said optical recirculation loop comprises an optical path length adjuster and said optical path length adjuster comprises a dispersion compensation unit to reduce the relative traveling length variations due to different wavelengths of said transmitted electromagnetic waves and said reflected electromagnetic waves.

5. The system of claim 1, wherein said optical recirculation loop comprises an electronic switch controlled by said computer.

6. The system of claim 1, wherein said optical recirculation loop comprises an optical path length random perturbation modulator to reduce the resonance effect on the noise signal in said optical recirculation loop.

7. The system of claim 6, wherein said optical path length random perturbation modulator comprises at least one of an optical phase shifter/modulator and a fiber stretcher.

8. The system of claim 1, wherein said optical recirculation loop comprises an optical amplifier and an optical isolator connected in series to amplify said electromagnetic waves.

9. The system of claim 8, wherein said optical amplifier comprises an erbium-doped fiber amplifier.

10. The system of claim 1, wherein said computer comprises a Fourier transform unit to transform said electromagnetic waves from a time domain to a frequency domain, and to obtain a Doppler shift and micro Doppler sidebands of a said target.

11. An interferoceiver apparatus comprising:
a first input;
a second input;
a combiner combining said first input and said second input;
an optical recirculation loop coupled to said combiner;
a splitter coupled to said optical recirculation loop to produce a first splitter output and a second splitter output;
a first photodetector coupled to said first splitter output;
a second photodetector coupled to said second splitter output;
a multiplexer circuit coupled to said first photodetector and said second photodetector producing a correlated output;

a filter coupled to said multiplexer circuit to process said correlated output; and a analog-to-digital converter coupled to said filter to digitize said filtered output.

12. The interferoceiver apparatus of claim 11, further comprising a radio frequency (RF) directional coupler coupled to receive input from said first splitter output.

13. The interferoceiver apparatus of claim 12, further comprising:
an electronic servo coupled to said RF directional coupler; and
an optical amplifier in said optical recirculation loop,
wherein said electronic servo controls said optical amplifier.

14. The interferoceiver apparatus of claim 11, further comprising a radio frequency (RF) phase shifter coupled to at least one of said first photodetector and said second photodetector.

15. The interferoceiver apparatus of claim 11, wherein said multiplexer circuit comprises at least one of a radio frequency (RF) mixer and a 2×1 RF combiner.

16. The interferoceiver apparatus of claim 15, wherein said multiplexer circuit comprises a Square Low RF detector.

17. The interferoceiver apparatus of claim 16, wherein said Square Low RF detector comprises a Low Barrier Schottky diode.

18. The interferoceiver apparatus of claim 11, wherein said filter comprises a low pass radio frequency (RF) filter.

19. The interferoceiver apparatus of claim 11, further comprising:
a gate coupled to said combiner and said optical recirculation loop;
a switch coupled to said optical recirculation loop; and
an electronic control device to control said gate and switch.

20. A method of detecting a target through electromagnetic waves, said method comprising:
transmitting a radio frequency (RF) pulse, said RF pulse transmitted by an RF transmission unit;
providing a secondary RF pulse, transmitted by said RF transmission unit and timed to arrive at a time gate when an antenna receives a received RF pulse;
modulating a first optical carrier with said received RF pulse;
providing a reference RF pulse comprising a second optical carrier;
conditioning said received RF pulse and said reference RF pulse in an optical recirculation loop to produce optical pulse replicas;
providing photodetectors to receive said optical pulse replicas and produce RF pulse replicas;
providing a multiplexer circuit coupled to said photodetectors to produce a correlated output;
providing a filter coupled to said multiplexer circuit to process said correlated output;
providing an analog-to-digital converter coupled to said filter to digitize said filtered output; and
processing said digitized filtered output, via a computing device, to detect said target.

* * * * *